(12) United States Patent
Fitzgerald et al.

(10) Patent No.: US 11,852,113 B2
(45) Date of Patent: Dec. 26, 2023

(54) FUEL INJECTOR HAVING SPRAY DUCTS SIZED FOR OPTIMIZED SOOT REDUCTION

(71) Applicant: Caterpillar Inc., Peoria, IL (US)

(72) Inventors: Russell P. Fitzgerald, Peoria, IL (US); Kenth I. Svensson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/096,978

(22) Filed: Jan. 13, 2023

(65) Prior Publication Data

US 2023/0243327 A1     Aug. 3, 2023

Related U.S. Application Data

(60) Provisional application No. 63/305,880, filed on Feb. 2, 2022.

(51) Int. Cl.
    *F02M 61/18*     (2006.01)
    *F02B 23/06*     (2006.01)

(52) U.S. Cl.
    CPC ..... *F02M 61/1846* (2013.01); *F02B 23/0651* (2013.01); *F02B 23/0669* (2013.01)

(58) Field of Classification Search
    CPC ............. F02M 61/1846; F02B 23/0651; F02B 23/0669
    USPC ....................................................... 123/445
    See application file for complete search history.

(56) References Cited

U.S. PATENT DOCUMENTS

| | | | |
|---|---|---|---|
| 4,700,672 A | 10/1987 | Baguena | |
| 5,072,706 A | 12/1991 | Eblen et al. | |
| 5,499,769 A | 3/1996 | Namiki et al. | |
| 5,772,122 A | 6/1998 | Sugiura et al. | |
| 6,422,199 B1 | 7/2002 | Buckley et al. | |
| 7,556,017 B2 | 7/2009 | Gibson | |
| 8,967,129 B2 | 3/2015 | Mueller | |
| 9,453,483 B2 | 9/2016 | Kim | |
| 9,518,547 B2 | 12/2016 | John | |
| 9,909,549 B2 | 3/2018 | Mueller | |
| 9,957,939 B2 | 5/2018 | Mahato et al. | |

(Continued)

FOREIGN PATENT DOCUMENTS

DE     10319980 A1     8/2014
GB     2003550 B     10/1982

(Continued)

OTHER PUBLICATIONS

JP2019120205A (Hisanori, Ito) (Jul. 22, 2019) (Machine Translation) (Year: 2019).*

(Continued)

*Primary Examiner* — Mahmoud Gimie
(74) *Attorney, Agent, or Firm* — Brannon Sowers & Cracraft PC

(57) ABSTRACT

A fuel injector includes a nozzle body having spray orifices formed therein each defining a spray orifice diameter dimension (d), and a plurality of spray ducts each in spray path alignment with one of the plurality of spray orifices and including a duct outlet defining a duct exit diameter dimension (D). Each of the spray ducts defines, together with the respective one of the spray orifices, a relative spray area reduction (SAR) at the duct outlet. The ratio of D/d is at least 14, and the SAR is 80% or greater. The configuration provides reduced soot production. Related methodology is disclosed.

20 Claims, 5 Drawing Sheets

(56) References Cited

U.S. PATENT DOCUMENTS

| | | |
|---|---|---|
| 9,964,088 B2 | 5/2018 | Zhang |
| 10,012,196 B1 | 7/2018 | Qi et al. |
| 10,151,235 B2 | 12/2018 | Anders et al. |
| 10,161,626 B2 | 12/2018 | Mueller |
| 10,563,597 B2 | 2/2020 | John et al. |
| 10,570,865 B2 | 2/2020 | Zhang |
| 10,808,601 B2 | 10/2020 | Hashizume |
| 10,883,454 B2 | 1/2021 | Amayah et al. |
| 10,900,450 B1 | 1/2021 | John |
| 11,035,333 B1 | 6/2021 | Wiebrecht |
| 11,236,719 B2 | 2/2022 | Kawakami |
| 2007/0023005 A1 | 2/2007 | Chemla |
| 2014/0216397 A1 | 8/2014 | Iida |
| 2015/0377197 A1 | 12/2015 | Yao |
| 2016/0298528 A1 | 10/2016 | Svensson |
| 2016/0298529 A1 | 10/2016 | Anders |
| 2016/0298584 A1 | 10/2016 | Svensson |
| 2017/0089310 A1 | 3/2017 | Svensson |
| 2017/0114763 A1 | 4/2017 | Mueller |
| 2017/0114998 A1 | 4/2017 | Mueller |
| 2017/0241368 A1 | 8/2017 | Anders |
| 2017/0356383 A1 | 12/2017 | Ito |
| 2018/0073447 A1 | 3/2018 | Wickstone |
| 2018/0195430 A1 | 7/2018 | Fitzgerald |
| 2018/0258836 A1 | 9/2018 | Anders |
| 2019/0063391 A1 | 2/2019 | Martin |
| 2019/0136745 A1 | 5/2019 | Kurtz |
| 2019/0145340 A1 | 5/2019 | John |
| 2019/0170103 A1 | 6/2019 | Martin |
| 2019/0195183 A1 | 6/2019 | Hashizume |
| 2019/0218959 A1 | 7/2019 | Klingbeil |
| 2019/0277185 A1 | 9/2019 | Hashizume |
| 2020/0003167 A1 | 1/2020 | Tavernier |
| 2020/0011236 A1 | 1/2020 | Tanno |
| 2020/0191045 A1 | 6/2020 | Gubba |

FOREIGN PATENT DOCUMENTS

| | | | |
|---|---|---|---|
| GB | 2348247 B | 2/2003 | |
| JP | 2019120205 A * | 7/2019 | ............. Y02T 10/12 |
| KR | 20190106767 A * | 9/2019 | ......... F02M 61/1853 |
| WO | 03078824 A1 | 9/2003 | |

OTHER PUBLICATIONS

Bobby John, Specification and Drawings for U.S. Appl. No. 16/531,826 Fuel System, Fuel Injector Nozzle Assembly, and Engine Head Assembly Structured for Ducted Fuel Injection, filed Aug. 5, 2019.

* cited by examiner

FUEL INJECTOR HAVING SPRAY DUCTS SIZED FOR OPTIMIZED SOOT REDUCTION

CROSS-REFERENCE TO RELATED APPLICATIONS

The present disclosure claims priority under 35 U.S.C. § 119(e) to U.S. Provisional Patent Application No. 63/305,880 filed on Feb. 2, 2022, of which is expressly incorporated by reference herein.

TECHNICAL FIELD

The present disclosure relates generally to a ducted fuel injector, and more particularly to a fuel injector spray duct optimized for soot reduction.

BACKGROUND

Internal combustion engines are configured with one or more combustion cylinders each associated with a piston to define a combustion chamber. Fuel is delivered into the combustion chamber to combust with air by a variety of techniques. In some engines, the fuel is directly injected by way of a fuel injector supported in an engine housing. Such fuel injectors typically include a plurality of spray orifices, the opening and closing of which is controlled by an outlet check.

Compression-ignition fuels are widely used throughout the world in engine applications ranging from vehicle propulsion to production of electrical power and operation of pumps, compressor, and various types of industrial equipment. Such fuels, notably diesel distillate fuel, can produce various undesired exhaust emissions. These undesired emissions must typically be trapped for later disposal, or otherwise treated to limit their discharge to the environment. Particulate matter, mainly soot, is one such undesired exhaust constituent. While soot can be trapped in a diesel particulate filter or DPF and later combusted, reduction of soot production in situ has received considerable attention in recent years.

Fuel injectors are known which utilize ducts to reduce the soot formed within the combustion chamber during engine operation. Such spray ducts typically include tubular structures positioned to receive fuel jets from the fuel injector. As the fuel jets advance through the spray duct air is entrained into the plume that is ultimately discharged into the combustion chamber. Among other properties, spray ducts can increase the so-called "liftoff length" of the fuel jets and thereby further enable enhanced mixing of air with the injected fuel prior to initiation of combustion.

One known ducted fuel injector is set forth in U.S. Pat. No. 10,012,196B1 and is entitled Duct Structure for Fuel Injector Assembly. Known ducted fuel injection arrangements appear to show considerable promise for widespread application. The art nonetheless provides ample room for improvement and development of alternative strategies.

SUMMARY

In one aspect, a fuel injector includes a nozzle body having a plurality of spray orifices formed therein and each defining a spray orifice diameter dimension (d). The fuel injector further includes a plurality of spray ducts each in spray path alignment with one of the plurality of spray orifices and including a duct outlet defining a duct exit diameter dimension (D). Each of the plurality of spray ducts defines, together with the respective one of the plurality of spray orifices, a relative spray area reduction (SAR) at the duct outlet. A ratio of D/d is at least 10, and the SAR is 80% or greater.

In another aspect, a method of operating an engine includes spraying fuel jets from spray orifices of a fuel injector, and advancing the fuel jets through spray ducts each having a duct outlet. The method further includes entraining an amount of air with each fuel jet within the respective spray duct sufficient to yield a minimum equivalence ratio at the duct outlet of 2.5, and impinging each of the fuel jets upon a duct wall within each respective spray duct to limit spreading of a spray area of each fuel jet of fuel by 80% or greater. The method further includes advancing the fuel jets into a combustion chamber in the engine, and compression-igniting the fuel jets in the combustion chamber.

In still another aspect, an internal combustion engine system includes an internal combustion engine having a combustion cylinder formed therein, and a fuel injector including a plurality of spray orifices formed therein, and a plurality of spray ducts each in alignment with one of the plurality of spray orifices. Each of the plurality of spray orifices defines a spray orifice diameter dimension (d). Each of the plurality of spray ducts includes a duct outlet, each duct outlet defining a duct exit diameter dimension (D) and positioned at a standoff distance from the corresponding one of the plurality of spray orifices. A relative spray area reduction (SAR) of each one of the plurality of spray ducts is based on d, D, and the standoff distance, and the SAR is at about 80% or greater.

BRIEF DESCRIPTION OF THE DRAWINGS

FIG. 4 is a graph of spray area reduction in comparison to liftoff length;

FIG. 5 is a graph of spray area reduction in comparison to apparent soot reduction;

DETAILED DESCRIPTION

Figure 1:
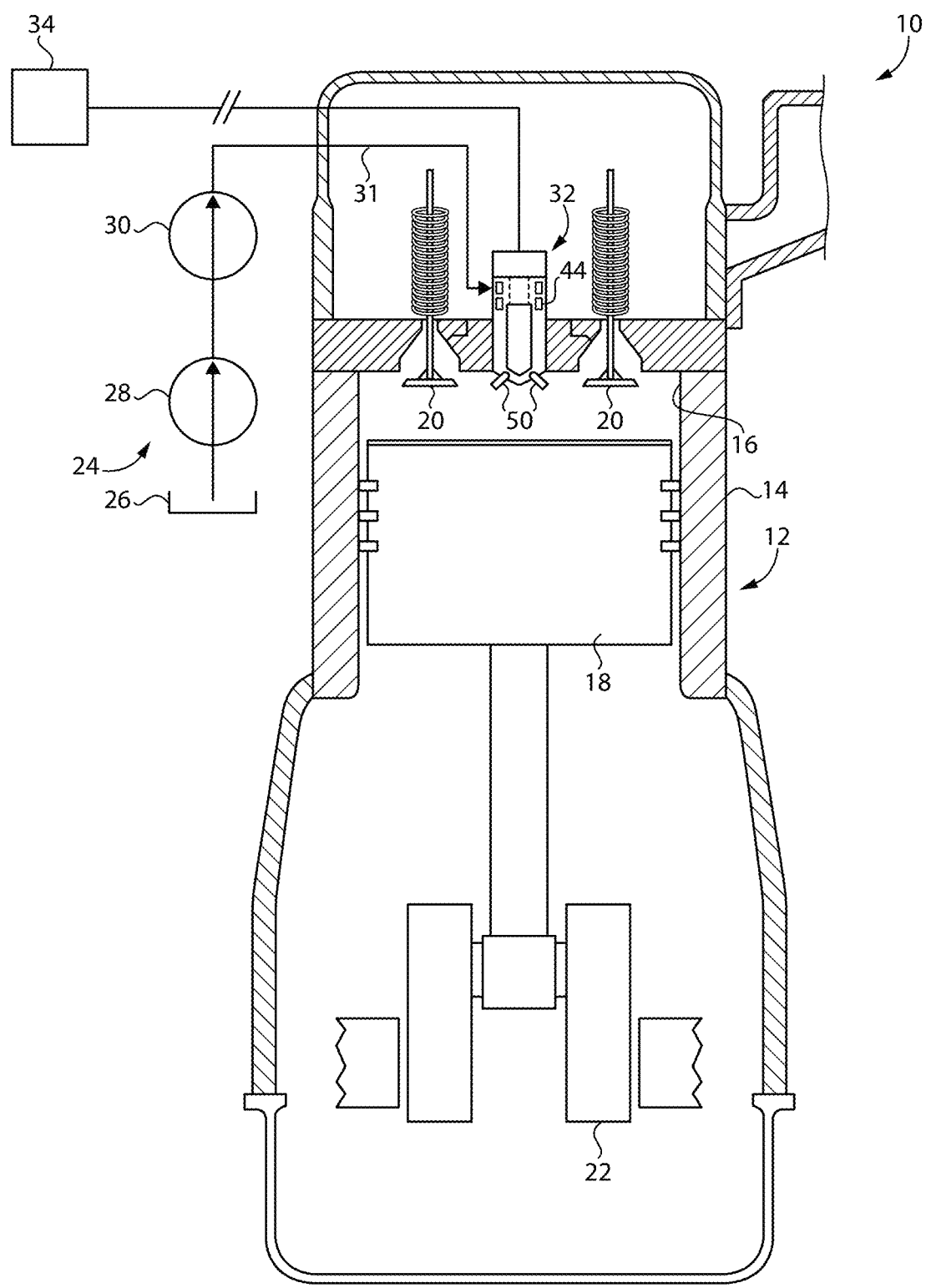
FIG. 1 is a partially sectioned diagrammatic view of an internal combustion engine system, according to one embodiment.

Referring to FIG. 1, there is shown an internal combustion engine system 10, according to one embodiment. Engine system 10 includes an internal combustion engine 12 having an engine housing 14 with a combustion cylinder 16 formed therein. Cylinder 16 may be one of a plurality of cylinders of any number and in any suitable arrangement. A piston 18 is movable within cylinder 16 between a top-dead-center position and a bottom-dead-center position, typically in a conventional four-stroke pattern, to increase a pressure in cylinder 16 to an autoignition threshold. In an implementation, engine system 10 is compression-ignited with piston 18 movable within cylinder 16 to increase a pressure of fluids therein to an auto-ignition threshold in a compression stroke. Piston 18, and any other such pistons in engine system 10, is coupled to a crankshaft 22 in a generally conventional manner. A plurality of engine valves 20, including for example two intake valves and two exhaust valves, are supported in engine housing 14 and movable to control fluid communication between cylinder 16 and an intake manifold and an exhaust manifold, also in a generally conventional manner. Engine system 10 may be used to operate a generator, a pump, a compressor, or a transmission to propel a vehicle, to name a few examples. Additional equipment not shown in FIG. 1 can include an intake system having a compressor in a turbocharger, and an exhaust system including a turbine in the turbocharger, and exhaust aftertreatment apparatus, for instance.

Engine system 10 further includes a fuel system 24 having a fuel supply 26, a low-pressure pump 28, and a high-pressure pump 30. High-pressure pump 30 provides a feed of pressurized fuel to a fuel conduit 31 extending to a fuel injector 32. Fuel conduit 31 can connect to, or may itself be, a pressurized fuel reservoir that maintains a supply of pressurized fuel at an injection pressure for a plurality of fuel injectors in engine system 10. Fuel injector 32 may include at least one electrically actuated valve 44 that controls operation of fuel injector 32 to inject pressurized fuel into cylinder 16. In a practical implementation the fuel includes diesel distillate fuel, however, the present disclosure is not thereby limited and other compression-ignition fuels or even a relatively low cetane number fuel mixed with a cetane enhancer might be used. An electronic control unit 34 is coupled to fuel injector 32 and energizes and deenergizes electrical actuator 44 in a generally known manner to control the timing and sometimes manner of fuel injection. Fuel injector 32 is also equipped with spray ducts 50 extending into cylinder 16 and attached to fuel injector 32 or engine housing 14. As will be further apparent from the following description, spray ducts 50 are uniquely configured by way of optimized size and/or positioning to provide reduced production of soot in comparison to certain other ducted and non-ducted fuel injector designs during operation of engine system 10.

Figure 2:
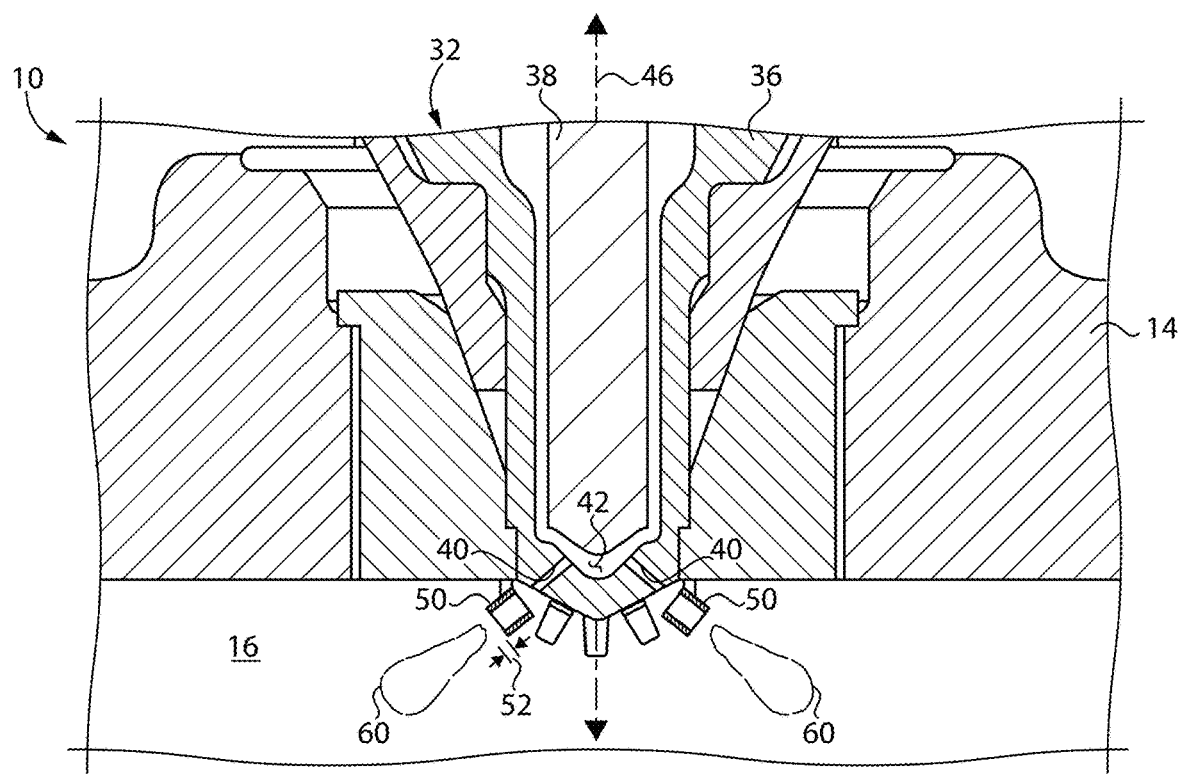
FIG. 2 is a sectioned diagrammatic view of a portion of the engine system as in FIG. 1.

Referring also now to FIG. 2, there are shown additional features of engine system 10 in further detail. Fuel injector 32 may include a nozzle body 36 that extends into cylinder 16 and is supported in engine housing 14. Nozzle body 36 includes a plurality of spray orifices 40 formed therein. Fuel injector 32 also includes an outlet check 38 movable generally along a center axis 46 of fuel injector 32 to control fluid communication between spray orifices 40 and a sac volume 42. Outlet check 38 may be directly controlled, such as by way of applying and relieving a closing hydraulic pressure on a hydraulic control surface of outlet check 38 based upon a position of a control valve operated by way of electrical actuator 44. Spray orifices 40 are oriented transversely to axis 46 and can include any number, for example, a number from 3 to 7, and are spaced circumferentially around axis 46.

Fuel injector 32 also includes a plurality of spray ducts 50 as noted above. Spray ducts 50 are each in spray path alignment with one of the plurality of spray orifices 40. Spray path alignment means that a center axis of a fuel spray jet extends through a spray duct typically, but not necessarily, parallel to a longitudinal axis of that spray duct. Fuel jets 60 are shown advancing from spray ducts 50 into cylinder 16. Jets 60 are shown as they might appear just commencing ignition at a liftoff length 52 spaced outwardly from the respective spray ducts 50. As further discussed herein, spray ducts 50 may be configured to balance sometimes competing factors of air entrainment sufficient to provide a desired equivalence ratio and velocity to provide a desired liftoff length.

Figure 3:
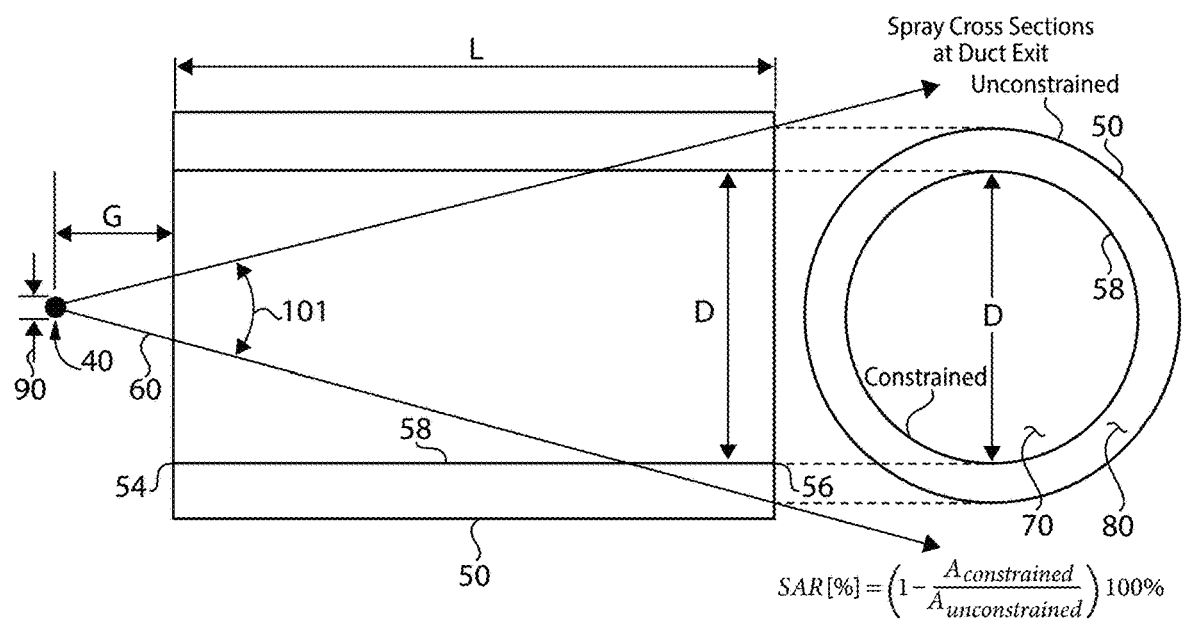
FIG. 3 is a diagrammatic view of a spray duct with spray cross-sections, according to one embodiment.

Referring now to FIG. 3, there is shown one of the plurality of spray ducts 50, hereinafter referred to at times in the singular, as it might appear in proximity to a spray orifice 40 and receiving a jet of fuel 60 sprayed from orifice 40. Each of the plurality of spray orifices 40 may define a spray orifice diameter dimension (d) identified with reference numeral 90 in FIG. 3. Spray duct 50 includes a duct inlet 54 and a duct outlet 56. Duct outlet 56 defines a duct exit diameter dimension (D). Spray duct 50 includes a duct inner wall 58 which may be cylindrical and uniform in diameter from duct inlet 54 to duct outlet 56. Spray duct 50 is spaced a first distance G from spray orifice 40. Duct outlet 56 in spray duct 50 is spaced from duct inlet 54 a duct length distance L that is different than the first distance G, and greater than the first distance G in the illustrated embodiment. In other instances, a duct length distance might be less than an analogous first distance, thus a distance between a duct inlet and duct outlet might be less than a distance from a spray orifice to the duct inlet. A standoff distance of each duct outlet 56 is defined as a sum of the first distance G and the duct length distance L. In an implementation, a ratio of D/d is at least 10. In a refinement, a ratio of D/d is at least 14, and in a further refinement, D/d is 14.5 or greater.

Spray duct 50 also defines, together with the respective one of spray orifices 40, a relative spray area reduction (SAR) at the respective duct outlet 56. The SAR may be 80% or greater, and in a refinement the SAR may be 85% or greater. As can be seen in FIG. 3, fuel jet 60 spreads at a spreading angle 101 as it advances from spray orifice 40 into spray duct 50. Spreading angle 101 may be from 15° to 30°, and will typically vary with orifice size and in-cylinder density as further discussed herein. Prior to reaching duct outlet 56, however, jet 60 impinges upon duct wall 58. As a result, continued spreading of the spray area of jet 60 is constrained by the impingement. At duct outlet 56 jet 60 has a constrained spray area (a spray cross-sectional area) that is reduced as compared to an unconstrained spray area jet 60 would have absent the impingement. Put differently, spray duct 50 throttles down the spreading of jet 60. According to well-known principles, however, the reduction in available area for jet 60 within spray duct 50 increases velocity of jet 60 and assists in providing a desired liftoff length from spray duct 50 where combustion within cylinder 60 commences.

As can also be seen in the end view of spray duct 50 depicted in FIG. 3, jet 60 may have an actual diameter D and an actual spray area 70. An otherwise expected spray area that might be observed absent the impingement upon duct inner wall 58 is shown at 80. The expected spray area might or might not be larger than an outer diameter dimension of spray duct 50. It has been discovered that it is desirable in some instances for inner duct diameter D to be large enough to allow sufficient air entrainment so that an equivalence ratio of mixed fuel and air exiting spray duct 50 (approximately at duct outlet 56) is low. In one practical implementation it is desirable for the minimum equivalence ratio to be 2.5, meaning a ratio of a stoichiometric air-fuel ratio (AFR) to an actual AFR is at least 2.5.

Desired minimum equivalence ratio limit in relation to duct geometry can be further understood according to the following Equation 1:

$$\varphi_{min} = \frac{\rho_{fuel} AFR_{stoich}}{\rho_{air}\left[\left(\frac{D}{d}\right)^2 - 1\right]}$$

Where:

$\varphi_{min}$=Equivalence Ratio Minimum
$\rho_{fuel}$=fuel density
$\rho_{air}$=air density AFR$_{stoich}$ and D and d are as discussed herein. Thus, the relationship generally among duct exit diameter, spray orifice diameter, and a minimum to desired equivalence ratio at the duct exit yielding optimized reduction in soot production according to the present disclosure can be understood.

It will be appreciated that as a jet of fuel travels through a duct the jet is sprayed through air. If duct diameter, including duct outlet diameter, is too small then fuel spray will occupy so much of the volume through the duct that there is little or no room for air that could theoretically be entrained. As noted above, however, it has also been observed that reducing the jet cross-sectional area (spray area) is desirable to increase the velocity of the jet. Accordingly, if the duct outlet is too large the spray area of the jet cannot be reduced sufficiently to achieve sufficient increase in velocity of the jet to obtain a desired liftoff length.

As noted, each spray duct 50 defines, together with a spray orifice 40, a relative spray area reduction SAR at the respective duct outlet 56. Larger spray orifices may be associated with a greater local equivalence ratio with other factors being equal, whereas smaller spray orifices may be associated with a lower local equivalence ratio with other factors being equal. It will also be recalled that first length G plus duct length L defines a standoff distance. Standoff distance of duct outlet 56 can be extended to provide relatively greater spray area reduction, or reduced to provide relatively less spray area reduction. The present disclosure provides a balance of these various factors to obtain a spray duct sizing and arrangement leading to optimized reduction in soot production.

Figures 4, 5:
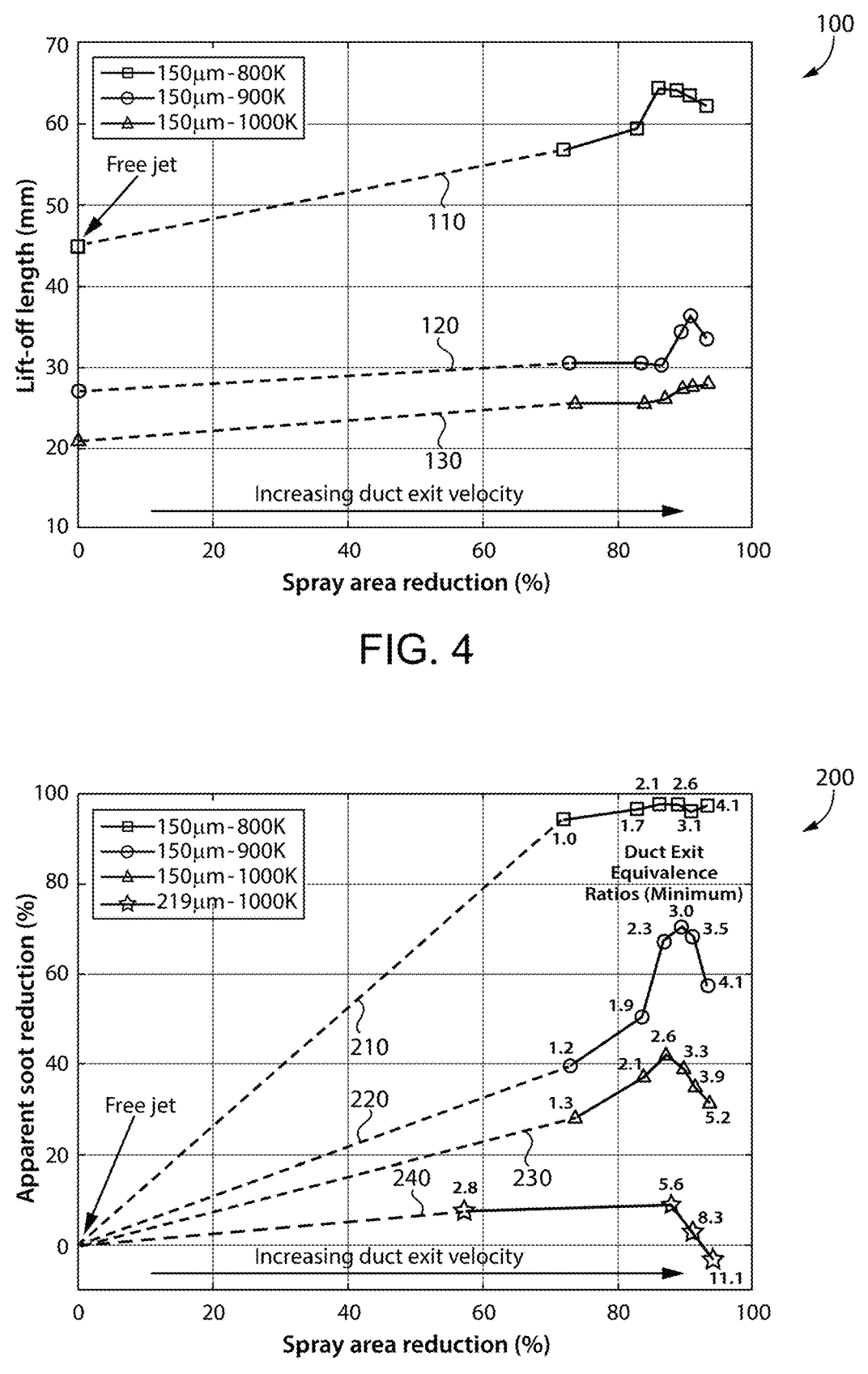

Focusing now on FIG. 4, there is shown a graph 100 illustrating spray area reduction on the X-axis in comparison to liftoff length on the Y-axis. A first line 110 illustrates what might be observed for an example ducted fuel jet according to the present disclosure and associated with a spray orifice of 0.150 millimeters at 800K. A second line 120 illustrates what might be observed for another example ducted jet employing a spray duct configured according to the present disclosure with a spray orifice of 0.150 millimeters at 900K. A third line 130 illustrates what might be observed with yet another ducted jet employing a spray duct configured according to the present disclosure. Data of line 130 might be obtained using a spray orifice of 0.150 millimeters at 1000K. It can be seen that a spray area reduction in the examples provided by lines 110, 120, and 130 shows a markedly increasing liftoff length just after approximately 80% spray area reduction (SAR), and most notably beginning at about an 85% spray area reduction (SAR). The designation "free jet" in FIG. 4 identifies data of 3 points at the different combinations of orifice size and temperature as might be expected with 0% SAR, and thus non-ducted.

Focusing now on FIG. 5, there is shown a graph 200 illustrating spray area reduction on the X-axis in comparison to apparent soot reduction on the Y-axis. A line 210 is based on data that might be obtained using a 0.150 millimeters spray orifice at 800K. A line 220 is based on data that might be obtained using a 0.150 millimeters spray orifice at 900K. Data of a line 230 might be obtained using a 0.150 millimeters spray orifice at 1000K, and data of a line 240 obtained using a 0.219 millimeters spray orifice at 1000K. It can be seen that apparent soot reduction rises sharply at just after 80% spray area reduction (SAR), and most sharply beginning at about 85% spray area reduction (SAR). It can also be noted that for the various data points minimum duct exit equivalence ratios shown next to the individual data points increases with the increased apparent soot reduction. Apparent soot reduction begins to fall off, however, at spray area reduction (SAR) between 85% and 90%. The limitation to apparent soot reduction is believed to result from spray area (SAR) reduction becoming large enough that entrainment of air is dropping off and the jets begin to become undesirably rich, resulting in increased soot.

Figure 6:
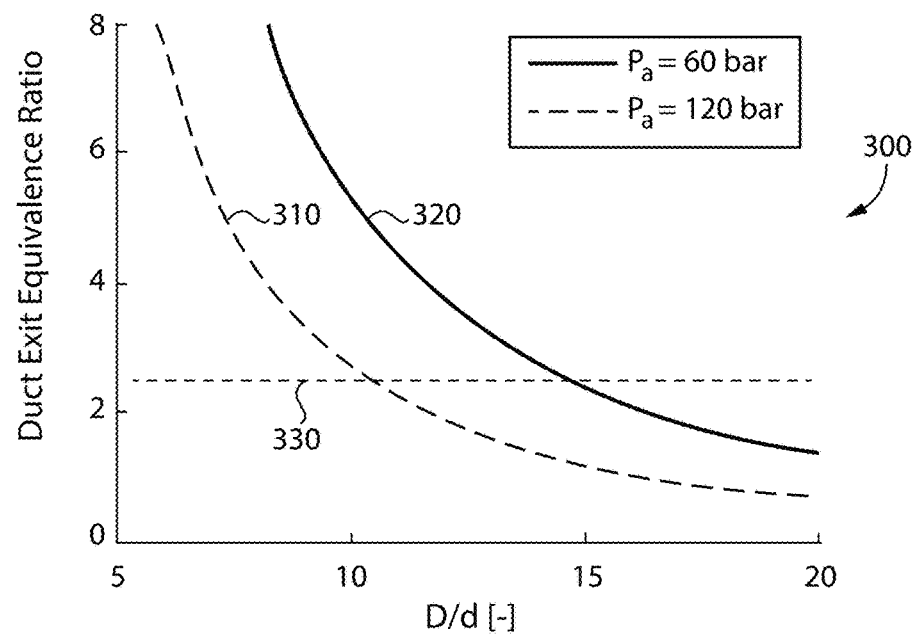
FIG. 6 is a graph of duct outlet to spray orifice diameter ratio in comparison to minimum duct exit equivalence ratio.

Focusing now on FIG. 6, there is shown a comparison of the ratio D/d on the X-axis in comparison to minimum duct exit equivalence ratio on the Y-axis in a graph 300. In graph 300 a line 310 shows minimum duct exit equivalence ratio at 120 bar cylinder pressure, and a line 320 shows minimum duct exit equivalence ratio at 60 bar cylinder pressure. A target minimum duct exit equivalence ratio of about 2.5 is shown at dashed line 330. It will be recalled a ratio of D/d is desirably at least 14, and more desirably 14.5 or greater. Accordingly, to obtain a desired or target minimum equivalence ratio of about 2.5, or greater, a ratio of D/d of at least 14, and more desirably 14.5 or greater, can be used. Under certain conditions, however, a D/d ratio of about 10 or greater may be desirable. Configuring a fuel injector and duct based on the equivalence ratio that might be observed in the 60 bar instance can ensure desired properties of soot reduction are observed in a sufficiently broad range of engine operating conditions.

Figure 7:
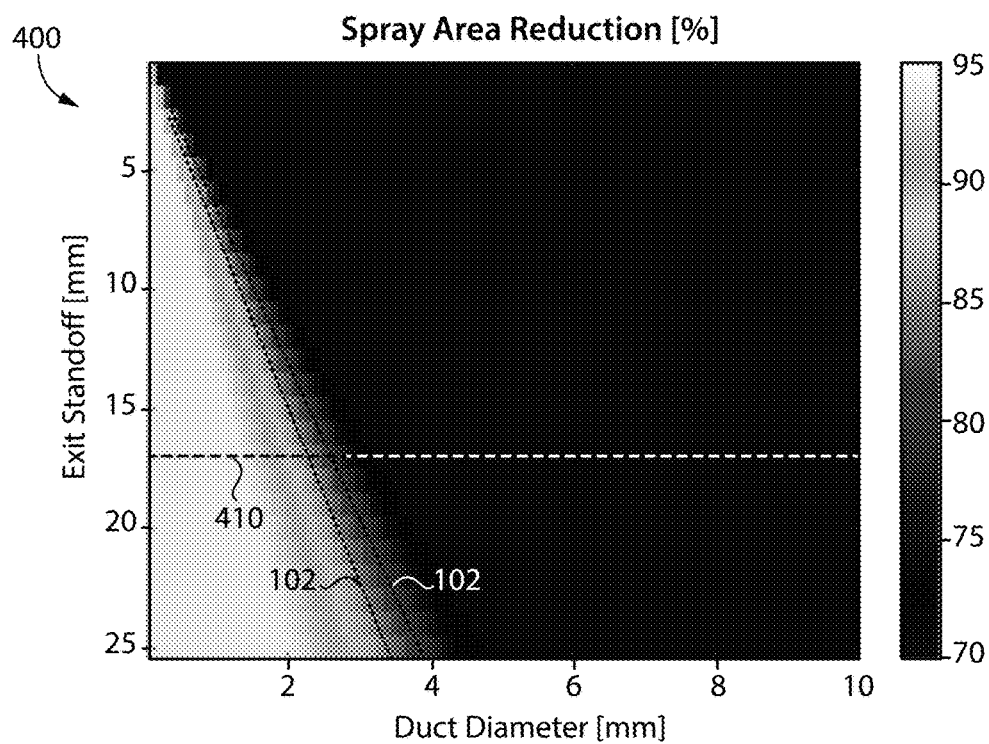
FIG. 7 is a diagram relating spray area reduction to duct diameter and exit standoff.

Focusing now on FIG. 7, there is shown another diagram 400 illustrating exit standoff on the Y-axis and duct diameter on the X-axis. Spray area reduction is shown by way of the legend to the right of diagram 400. It can be seen also that a spray area reduction (SAR) target at or near 85% (shown generally between the diagonal dashed lines 102 in FIG. 7) might be observed for a range of exit standoff distances that increases with increasing duct diameter. Put differently, diagram 400 shows that one or both of duct diameter and exit standoff can be varied and a target SAR still obtained. At an exit standoff distance of about 25 millimeters a SAR of about 85% could be obtained with a duct diameter of close to 4 millimeters. At a shorter exit standoff distance of, say, 10 millimeters, a SAR of about 85% could be obtained with a duct diameter of close to 2 millimeters. In diagram 400 a dashed line 410 shows an exit standoff distance of about 17 millimeters and a duct diameter of slightly larger than 2 millimeters, between about 2 millimeters and about 2.5 millimeters. In at least some instances, going to a larger exit standoff distance would counsel in the direction of using a larger duct diameter, and going to a smaller exit standoff distance would counsel in the direction of using a smaller duct diameter.

In consideration of FIG. 7 it can be appreciated that increasing exit standoff can maintain a generally desired range of spray area reduction with increased duct diameter, and vice versa. It will be recalled, however, that extending exit standoff causes a jet of fuel to impinge at a location in the spray duct relatively further from the duct outlet (toward the spray orifice). If the exit standoff is made too large, however, an injected jet may begin to ignite within the duct itself. If the exit standoff is made too short, however, duct diameter may need to be reduced to the point that equivalence ratio becomes too rich as discussed above.

Figure 8:
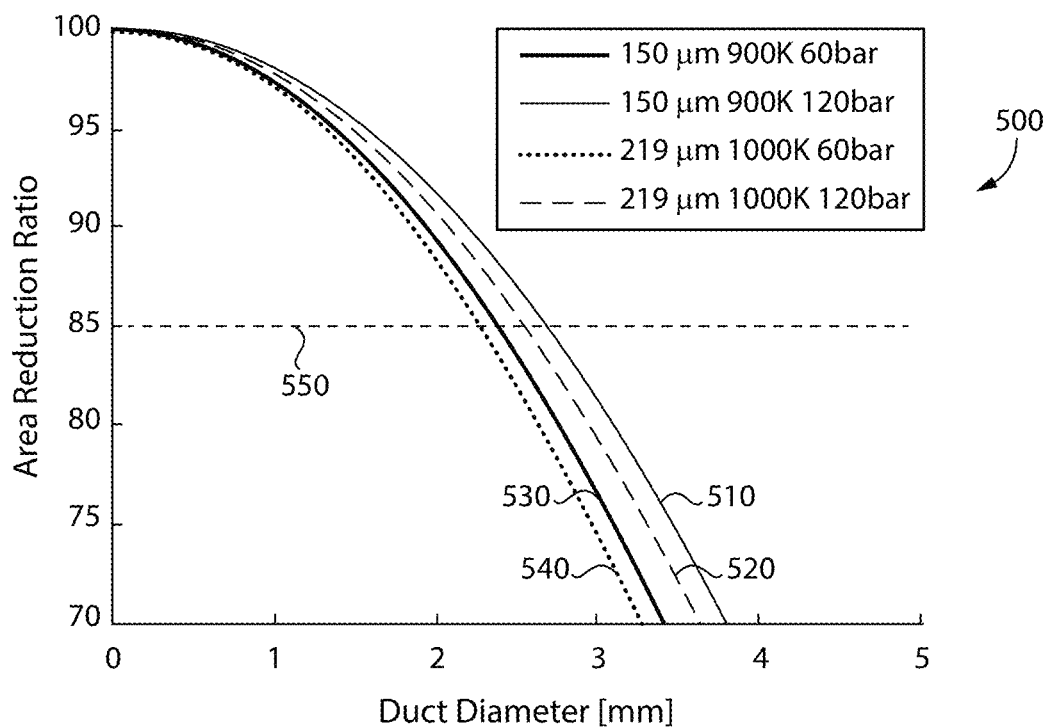
FIG. 8 is a graph comparing duct diameter to area reduction ratio.

Focusing now on FIG. 8, there is shown a graph 500 illustrating duct diameter on the X-axis in comparison to spray area reduction ratio (SAR) on the Y-axis. A dashed line 550 shows a target area reduction ratio of approximately 85%. A line 510 shows what might be expected using a 0.150 millimeters spray orifice at 900K and 120 bar cylinder pressure. A line 520 shows what might be expected using a 0.219 millimeters spray orifice at 1000K and 120 bar cylinder pressure. A line 530 shows what might be observed using a 0.150 millimeters spray orifice at 900K and 60 bar cylinder pressure, and a line 540 shows what might be observed using a 0.219 millimeters spray orifice at 1000K and 60 bar cylinder pressure. Following FIG. 8 generally, and other teachings herein, fuel injectors having spray ducts with a range of sizes and spray orifices with a range of sizes, suitable for a range of engine operating conditions, can be realized. Spray orifices according to the present disclosure may define a spray orifice diameter dimension d from 0.09 millimeters to 0.35 millimeters, in a refinement from 0.09 millimeters to 0.28 millimeters, and duct exit diameter D might range from 1.3 millimeters to 4.0 millimeters. Certain practical applications might include a fuel injector having spray orifices at 0.09 millimeters, at 0.150 millimeters, or at 0.275 millimeters, for example. Certain practical applications might include duct exit diameters at 1.3 millimeters, 2.2 millimeters, 3.4 millimeters, or 4.0 millimeters in some embodiments. Exit standoff distance might range from 10 millimeters to 30 millimeters.

In many instances a fuel injector according to the present disclosure will have spray orifices, spray duct exits, and standoff distances all of uniform size, however, in some embodiments different sized orifices, different sized ducts, or even different standoff distances could be used within the same fuel injector. Moreover, while spray orifices will typically all be fluidly connected to a nozzle chamber/sac volume simultaneously, in some embodiments two outlet checks might be independently controlled to inject fuel selectively through different sets of ducted spray orifices or even through a ducted set of spray orifices versus a non-ducted set of spray orifices.

INDUSTRIAL APPLICABILITY

Referring to the drawings generally, operating engine system 10 can include spraying fuel jets from spray orifices 40 of fuel injector 32, and advancing the fuel jets through spray ducts 50 each having a duct outlet 56. Operating engine system 10 can further include entraining an amount of air with each jet within the respective spray duct sufficient to yield a minimum equivalence ratio at the duct outlet of approximately 2.5. Within each respective spray duct 50 each of the fuel jets may be impinged upon a duct wall 58 to limit spreading of a spray area of each jet by 80% or greater, more particularly 85% or greater in some embodiments. The fuel jets may be advanced from spray ducts 50 into the combustion chamber or cylinder 16 in engine 12, and the fuel jets ignited by compression ignition therein.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." The term "about" or analogous relative terms mean generally or approximately, including within measurement error or another tolerance as would be understood by a person skilled in the pertinent technical field such as conventional rounding to a consistent number of significant digits. Where only one item is intended, the term "one" or similar language is used. Also, as used herein, the terms "has," "have," "having." or the like are intended to be open-ended terms. Further, the phrase "based on" is intended to mean "based, at least in part, on" unless explicitly stated otherwise.

What is claimed is:

1. A fuel injector comprising:
    a nozzle body having a nozzle chamber and a plurality of spray orifices extending from the nozzle chamber formed therein, and each of the plurality of spray orifices defining a spray orifice diameter dimension (d);
    a plurality of spray ducts in spray path alignment with each respective one of the plurality of spray orifices and including a duct outlet defining a duct exit diameter dimension (D);
    a check movable in the nozzle body between a first position where the plurality of spray orifices are all blocked from the nozzle chamber, and a second position where the plurality of spray orifices are all simultaneously fluidly connected to the nozzle chamber, and wherein the plurality of spray orifices includes all spray orifices of the fuel injector blocked by the check at the first position;
    each of the plurality of spray ducts defining, together with the respective one of the plurality of spray orifices, a relative spray area reduction (SAR) at the duct outlet;
    a ratio of D/d is at least 10; and
    the SAR is 80% or greater.

2. The fuel injector of claim 1 wherein D/d is 14 or greater.

3. The fuel injector of claim 2 wherein the SAR is 85% or greater.

4. The fuel injector of claim 1 wherein each of the spray ducts defines a fuel jet passage uniform in diameter from a duct inlet to the respective duct outlet.

5. The fuel injector of claim 4 wherein:
    each of the plurality of spray ducts is spaced a first distance from the respective one of the plurality of spray orifices, and each respective duct outlet is spaced from the duct inlet a duct length distance; and
    a standoff distance of each duct outlet is defined as a sum of the first distance and the duct length distance.

6. The fuel injector of claim 5 wherein the standoff distance is from 10 millimeters to 30 millimeters.

7. The fuel injector of claim 1 wherein:
    d is from 0.09 millimeters to 0.35 millimeters; and
    D is from 1.3 millimeters to 4.0 millimeters.

8. A method of operating an engine comprising:
    spraying fuel jets of a fuel from spray orifices of a fuel injector;
    advancing the fuel jets through spray ducts each having a duct outlet;
    entraining an amount of air with each fuel jet within the respective spray duct sufficient to yield a minimum equivalence ratio at the duct outlet of 2.5;
    impinging each of the fuel jets upon a duct wall within each respective spray duct to limit spreading of a spray area of each fuel jet by 80% or greater;
    advancing the fuel jets into a combustion chamber in the engine; and
    compression igniting the fuel jets in the combustion chamber;
    wherein all of the fuel compression ignited in the combustion chamber is advanced into the combustion chamber via the spray ducts.

9. The method of claim 8 wherein the spray duct outlets are larger in diameter than the spray orifices by a factor of 14 or greater.

10. The method of claim 9 wherein the spray duct outlets are larger in diameter than the spray orifices by a factor of 14.5 or greater.

11. The method of claim 9 wherein the spray orifices are from 0.09 millimeters to 0.35 millimeters in diameter, and the spray duct outlets are from 1.3 millimeters to 4.0 millimeters in diameter.

12. The method of claim 8 wherein the impinging each of the jets includes impinging the jets to limit spreading of the spray area by 85% or greater.

13. The method of claim 8 wherein each of the plurality of spray ducts is spaced a first distance from the respective one of the plurality of spray orifices, and each respective duct outlet is spaced from the duct inlet a duct length distance different than the first distance.

14. The method of claim 13 wherein a standoff distance of each duct outlet is defined as a sum of the first distance and the duct length distance, and the standoff distance is from 10 millimeters to 30 millimeters.

15. An internal combustion engine system comprising:
an internal combustion engine having a combustion cylinder formed therein;
a fuel injector including a plurality of spray orifices formed therein, and a plurality of spray ducts each in alignment with one of the plurality of spray orifices;
the fuel injector including a check movable between a first position where the plurality of spray orifices are all blocked, and a second position where the plurality of spray orifices are all open, and wherein the plurality of spray orifices includes all spray orifices of the fuel injector blocked by the check at the first position;
each of the plurality of spray orifices defining a spray orifice diameter dimension (d);
each of the plurality of spray ducts including a duct outlet, each duct outlet defining a duct exit diameter dimension (D) and positioned at a standoff distance from the corresponding one of the plurality of spray orifices;
a relative spray area reduction (SAR) of each one of the plurality of spray ducts is based on d, D, and the standoff distance; and
the SAR is at about 80% or greater.

16. The engine system of claim 15 wherein the SAR is 85% or greater.

17. The engine system of claim 15 wherein the spray duct outlets are larger in diameter than the spray orifices by a factor of 14 or greater.

18. The engine system of claim 15 wherein the internal combustion engine includes a piston movable within the cylinder to increase a pressure in the cylinder to an autoignition threshold.

19. The engine system of claim 15 wherein d is from about 0.09 millimeters to about 0.35 millimeters, and D is from 1.3 millimeters to about 4.0 millimeters.

20. The engine system of claim 19 wherein the standoff distance is from about 10 millimeters to about 30 millimeters.

* * * * *